United States Patent [19]

Makishima

[11] 4,280,584
[45] Jul. 28, 1981

[54] EMERGENCY LOCKING RETRACTOR

[75] Inventor: Yoshihiro Makishima, Yokohama, Japan

[73] Assignee: NSK-Warner K.K., Tokyo, Japan

[21] Appl. No.: 55,957

[22] Filed: Jul. 9, 1979

[30] Foreign Application Priority Data

Jul. 10, 1978 [JP] Japan .............................. 53-93920[U]

[51] Int. Cl.³ ............................................ A62B 35/00
[52] U.S. Cl. ............................. 180/268; 242/107.4 A; 280/806; 297/477; 297/478
[58] Field of Search ............................ 180/268, 271; 242/107.4 R, 107.4 A; 297/476, 477, 478; 280/801, 806

[56] References Cited

U.S. PATENT DOCUMENTS

| | | | |
|---|---|---|---|
| 2,705,529 | 4/1955 | Bull et al. ................ | 242/107.4 R X |
| 3,740,000 | 6/1973 | Takada ....................... | 242/107.4A |
| 3,807,522 | 4/1974 | Becker ....................... | 242/107.4 A |
| 3,825,205 | 7/1974 | Takada ....................... | 242/107.4 A |
| 3,952,966 | 4/1976 | Burleigh ...................... | 242/107.4 R |

Primary Examiner—Joseph F. Peters, Jr.
Assistant Examiner—Michael Mar
Attorney, Agent, or Firm—Shapiro and Shapiro

[57] ABSTRACT

An emergency locking retractor comprises a lock member capable of assuming a position in which it engages an engaging portion integral with a webbing take-up shaft to lock the rotation of the shaft in webbing draw-out direction and a position in which it does not engage the engaging portion. A speed change sensing member is adapted, when it senses a greater speed change of a vehicle than a predetermined value, to shift from a first condition to a second condition and thereby move the lock member to the engaging position. The retractor also includes a switch-actuated electrical system for moving the lock member independently of the sensing member.

7 Claims, 6 Drawing Figures

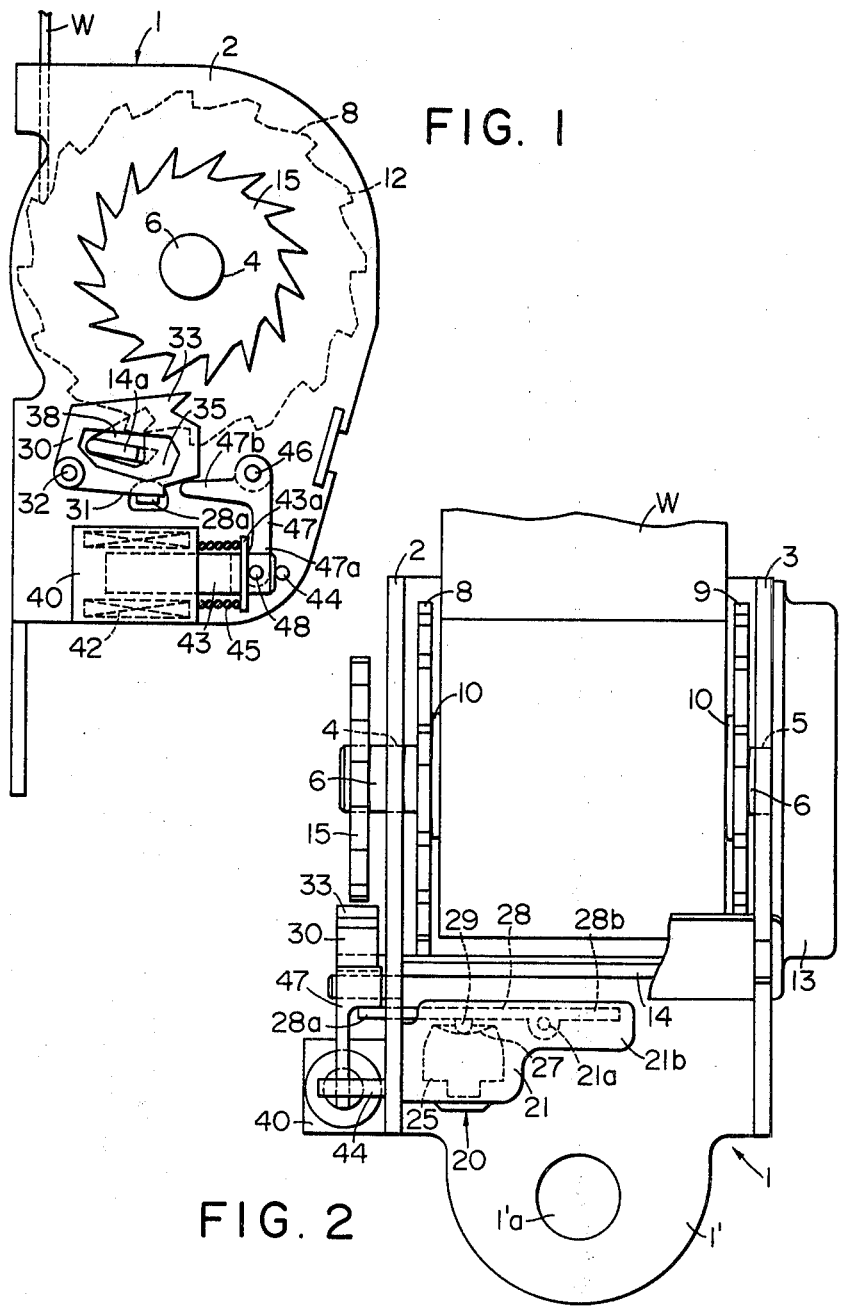

EMERGENCY LOCKING RETRACTOR

BACKGROUND OF THE INVENTION

1. Field of the Invention

This invention relates to a so-called emergency locking retractor provided with speed change sensing means which is operative to lock the draw-out of webbing when a speed change greater than a predetermined value occurs to a vehicle, and additionally provided with electrical means for acting on the speed change sensing means and switch means for energizing and deenergizing the electrical means.

2. Description of the Prior Art

A certain type of the emergency locking retractor (hereinafter referred to as the ELR) suffers from the following problems. First, it is actually difficult to check whether or not the ELR is actually operative after it has been attached to a vehicle or the like, because such check must be effected with a considerable degree of speed change imparted to the vehicle body. Therefore, such check of the ELR is effected before it is attached to the vehicle or the like and it is regarded as good if it passes this check. However, this is not safe enough to the rider of the vehicle and there is a desire on the part of the rider for the ELR attached to the vehicle or the like to be checked in some way or other.

SUMMARY OF THE INVENTION

It is an object of the present invention to provide an emergency locking retractor which overcome the above-noted problems.

According to the present invention, the emergency locking retractor comprises a lock member capable of assuming a position in which it engages an engaging portion integral with a webbing take-up shaft to lock the rotation of the shaft in webbing draw-out direction and a position in which it does not engage the engaging portion; speed change sensing means adapted, when it senses a greater speed change of a vehicle than a predetermined value, to shift from a first condition in which it causes the lock member to assume its non-engaged position to a second condition in which it causes the lock member to assume its locking position to move the lock member to its locking position; electrical means energized to cause at least a portion directly acting on the lock member of the speed change sensing means to shift from the first condition to the second condition; and switch means for energizing and deenergizing the electrical means.

The invention will become more fully apparent from the following detailed description thereof taken in conjunction with the accompanying drawings.

BRIEF DESCRIPTION OF THE DRAWINGS

FIG. 1 is a side view of a first embodiment of the present invention.

FIG. 2 is a front view corresponding to FIG. 1.

DESCRIPTION OF THE PREFERRED EMBODIMENTS

Figure 3:
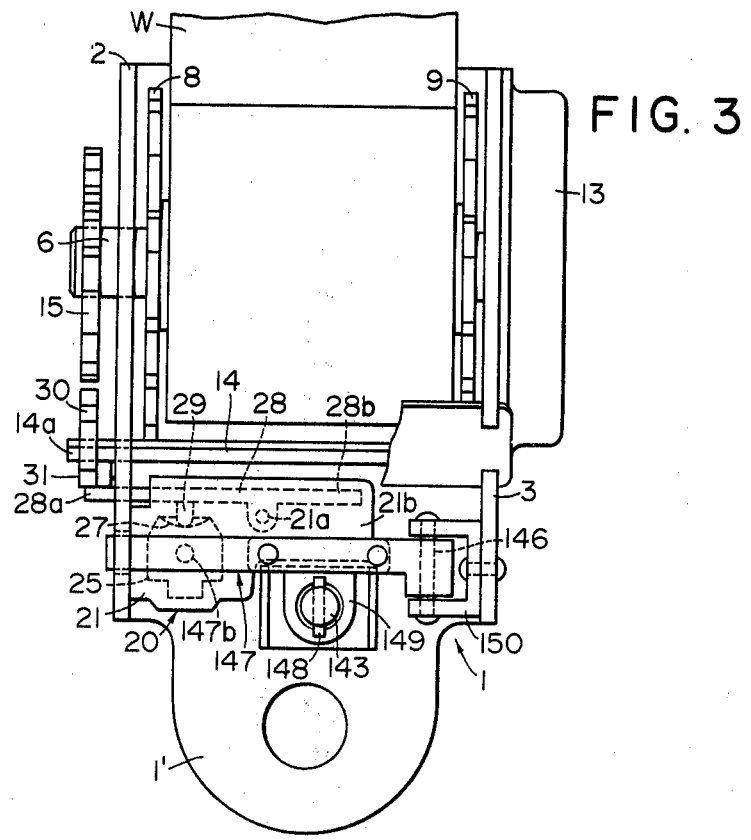
FIG. 3 is a front view of a second embodiment of the present invention.

FIG. 1 is a side view of an embodiment of the present invention, and FIG. 2 is a front view thereof. A reference numeral 1 designates the frame of a retractor. The frame 1 has a substantially U-shaped cross-section and has a base 1' and side plates 2 and 3 forming the riser portions from the base 1'. The base 1' is formed with a circular aperture 1'a through which a fastening member for attaching the retractor to a suitable location on a vehicle or the like may be passed. Opposed circular apertures 4 and 5 are formed substantially centrally of the side plates 2 and 3, and a take-up shaft 6 for taking up webbing W is rotatably supported in the circular apertures 4 and 5. The take-up shaft 6 is rotatable with flanges 8 and 9 secured to this shaft, a sleeve 10 surrounding the shaft and secured to the flanges 8, 9, and a ratchet gear 15 secured to the outer side of the flange 8. The shaft 6 is biased in a direction to take up the webbing by a take-up spring (not shown) accommodated in a box 13 secured to the outer surface of the side plate 5. The outer peripheral portions of the flanges 8 and 9 are formed with ratchet teeth 12 which may mesh with a lock bar 14, to be described, in an emergency to thereby stop rotation of the shaft 6.

The frame side plate 2 has attached thereto the case 21 of the sensing parts 20 of speed change sensing means. An inertia sensing member 25 formed such that the center of gravity thereof lies in the lower half thereof is placed within the case 21 of the sensing parts of the speed change sensing means. The sensing member 25 normally assumes its upright position as shown in FIG. 2, but when the vehicle or the like makes a greater speed change than a predetermined value, the sensing member 25 becomes tilted under an inertia force. However, it may return to its original or upright position because its center of gravity lies in its lower half. The top of the sensing member 25 is formed with a shallow conical recess 27 on which rests the downward projection 29 of a first drive member in the form of a lever 28 rotatably mounted on the upper central portion of the case 21. The lever 28 is rotatable, as will later be described, upon tilting of the sensing member 25, with projection 29 forming a mechanical connection therebetween and if the lever is formed so as to be substantially bilateral symmetrical in length with respect to the pivot 21a of the lever, it may more sensitively tilt when it receives a small force resulting from the tilting of the sensing member 25. Also, if design is made such that one end 28b of the lever 28 strikes against the extension 21b of the case 21 when the lever 28 is tilted by a predetermined amount under the influence of the tilting of the sensing member 25, it is possible to prevent the sensing member 25 from tilting to such an extent that it cannot return to its original position or from jumping out of the case 21.

Above the sensing portion 20 of the speed change sensing means, a ratchet lever 30 forming the force transmitting portion of the speed change sensing means is rotatably mounted on the frame side plate 2 by means of a pin 32 with the bottom surface 31 of the ratchet lever resting on one end 28a of the lever 28. The ratchet lever 30 has a ratchet tooth 33 and normally assumes a first position in which it is placed on one end 28a of the lever 28 from gravity and is in non-engagement with the ratchet gear 15 secured to the shaft 6. However, when a greater speed change than a predetermined value occurs to the vehicle or the like, the lever 28 tilts as already described, whereby the ratchet lever 30 is forced upwardly by the lever 28 to assume a second position in which the ratchet tooth 33 meshes with the ratchet gear 15.

A hole 35 is formed centrally of the ratchet lever 30, and one end 14a of the lock bar 14 resting in sector holes 38 (only one of which is seen in FIG. 1) formed in opposed relationship in the frame side plates 2 and 3 is inserted in the hole 35 with a suitable allowance. The lock bar 14 is normally in non-engagement with the ratchet teeth 12 formed on the flanges 8 and 9 of the shaft 6, but when a speed change occurs to the vehicle or the like, the ratchet tooth 33 of the ratchet lever 30 meshes with the ratchet gear 15 in the manner already described and by the clockwise rotational force of the ratchet gear 15 as viewed in FIG. 1, the ratchet lever 30 is further rotated in counter-clockwise direction as viewed in FIG. 1. Thus, the lock bar 14 is upwardly rocked in the sector hole 38 by the ratchet lever 30 and meshes with the ratchet teeth 12 of the flanges 8, 9 to lock the shaft 6 against webbing draw-out rotation. From this, it may be said that such engaging relation between the hole 35 of the ratchet lever 30 and the end 14a of the lock bar 14 is enough as enables the ratchet lever 30 to bring the lock bar 14 into locking position when the ratchet lever is rotated by the rotational force of the ratchet gear 15. Here, by suitably determining the relationship among the ratchet gear 15, the ratchet lever 30, the lock bar 14 and the ratchet teeth 12 of the flanges 8, 9, the initial meshing position of the lock bar 14 with the ratchet teeth 12 of the flanges 8, 9 can be determined.

An example of the emergency locking retractor has been described above. In the present embodiment, a speed change sensing means check mechanism for moving the ratchet lever 30 to its second position in response to the operation of the vehicle's foot brake as will hereinafter be described is added to such ELR.

In FIGS. 1 and 2, a reference numeral 40 designates a solenoid container secured to the outer surface of the frame side plate 2 below the ratchet lever 30. A hollow portion leading to the outside is formed in the center of the container 40, and a plunger 43 is inserted in the hollow portion and biased rightwardly, as viewed in FIG. 1, by a coil spring 45 mounted between the end of the container 40 and the flanged portion 43a of the plunger 43. The rightmost position of the plunger 43 is limited by a stop pin 44 extending from the side plate 2. An actuator 47 supported on the side plate 2 by a pivot pin 46 is provided above the plunger 43 and rightwardly of the ratchet lever 30. The actuator 47 forming a second drive member, has two arm portions 47a and 47b. One 47a of the arm portions is pivotally secured to the outer end of the plunger 43 by a pin 48, and the other arm portion 47b is engaged with the right portion of the bottom surface 31 of the ratchet lever 30.

Operation of the present embodiment will now be described on the basis of the above-described construction.

The speed change sensing means will first be described. When the vehicle or the like is in normal running condition, the inertia sensing member 25 is in its upright position as shown in FIG. 2, and the ratchet lever 30 is in its non-meshing position with the ratchet gear 15. Thus, the lock bar 14 is not operative yet.

If a greater speed change than a predetermined value occurs to the vehicle or the like, the sensing member 25 will be tilted due to inertia force to force the projection 29 upwardly, and one end 28a of the lever 28 will rotate the ratchet lever 30 about the pin 32 to thereby cause the ratchet tooth 33 to mesh with the ratchet gear 15. On the other hand, due to the aforementioned speed change, the seat belt wearer will lean forwardly and the webbing W will be rapidly drawn out, so that the shaft 6 and the ratchet gear 15 will be rapidly rotated. Accordingly, the ratchet lever 30, which has reached its meshing position with the ratchet gear 15, will receive the rotational force from the ratchet gear 15 to upwardly rock the lock bar 14 into meshing engagement with the ratchet teeth 12 of the flanges 8, 9, thus locking the shaft 6.

Figure 5:
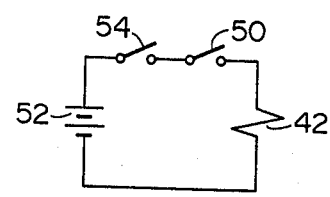
FIG. 5 is a diagram of an electric circuit including a solenoid.

However, as previously mentioned, it is difficult to check whether or not the speed change sensing means will properly operate as described above after the ELR has been attached to the vehicle. Thus, the check mechanism of the present embodiment checks it. Description will be made on the assumption that the solenoid 42 of the check mechanism is connected in the electrical circuit as shown in FIG. 5. In FIG. 5, reference numerals 42, 50 and 52 respectively designate the solenoid, a foot brake switch adapted to be closed when the foot brake is stepped on, and a battery. A reference numeral 54 denotes an engine key switch or a buckle switch adapted to be closed when the buckle in the seat belt system is latched. Therefore, when the engine key switch is closed with the engine being operated or when the buckle switch is closed with the seat occupant wearing the seat belt, if the driver steps on the foot brake to close the foot brake switch 50, the solenoid 42 is energized to attract the plunger 43 leftwardly, as viewed in FIG. 1, against the force of the coil spring 45. Consequently, the actuator 47 is rotated clockwisely to bring the ratchet lever 30 into its meshing position with the ratchet gear 15.

Thus, if the driver operates the engine or wears the seat belt and steps on the foot brake without actually imparting a speed change greater than a predetermined value to the vehicle, it is always possible to check whether or not the speed change sensing means operates normally.

The above-described embodiment is only an illustrative example and the following modifications may be made. First, only a manually operable switch may be included in the circuit in which the solenoid 42 is connected. In this case, checking can be accomplished by closing this switch as desired. Secondly, design may be made such that the ratchet lever 30, etc. are moved directly by an electromagnet, a solenoid or the like without the intermediacy of the actuator 47 or the like. Thirdly, design can be made such that the sensing means is checked by tilting the sensing member 25 by a check mechanism. This may be said to be rather suitable as that of the speed change sensing means.

Figure 4:
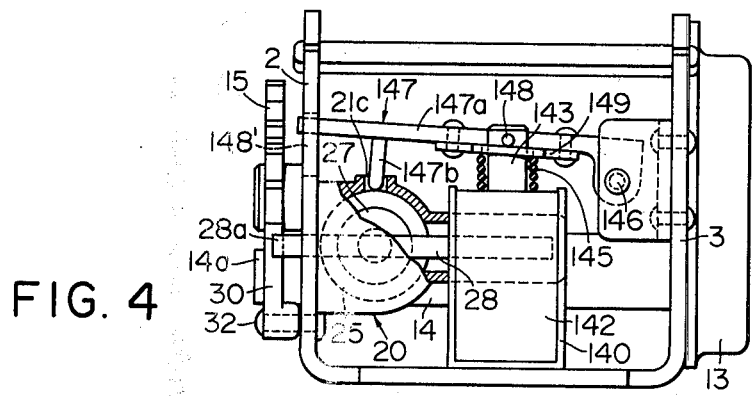
FIG. 4 is a bottom view corresponding to FIG. 3.

A second embodiment in which checking is made with the sensing member 25 tilted will now be described by reference to FIG. 3 and FIG. 4 which is a bottom view corresponding to FIG. 3. Those portions of the second embodiment which correspond to the solenoid parts and actuator parts of the first embodiment are given reference numerals having 100 added to the reference numerals used for the first embodiment. The main differences of the second embodiment from the first embodiment consist in the shape of the actuator 147, the method of connection between the actuator 147 and the plunger 143, and the location of the solenoid, etc. That is, the solenoid container 140 is attached to the lower portion of the base 1' of the frame 1, and the actuator 147 comprises a first long arm portion 147a and a second short arm portion 147b, and is pivotally mounted at one end of the first arm portion 147a on a holding member 150 by means of a pivot pin 146, the holding member being secured to the side plate 3. The direction of this pivotal movement is perpendicular to the base 1'. Also, the actuator 147 is connected to the plunger 143 by the plunger's extending through a plate 149 attached to the intermediate portion of the first arm portion 147a and by the plate's being held between a pin 148 and a coil spring 145. The other end of the first arm portion 147a is guided in a guide hole 148' formed in the side plate 2, and the second arm portion 147b passes through a hole 21c formed in the case 21 of the sensing member 25 into contact with the side wall of the sensing member 25. Accordingly, when the solenoid is energized to attract the plunger 143, the first arm portion 147 is pivoted counter-clockwisely about the pivot pin 146 as viewed in FIG. 4 and along therewith, the second arm portion 147b deeply comes into the case 21 to tilt the sensing member 25. Thus, as already described, the lock bar 14 is brought down into meshing engagement with the ratchet teeth of the flanges 8, 9 to lock the shaft 6 against webbing draw-out rotation. The other details of the second embodiment are similar to those of the first embodiment and need not be described.

The above-described two embodiments may be said to be the so-called dual type emergency locking retractors. The time when the draw-out of the webbing must be locked is the time when a great speed change occurs to the vehicle or the like to exert a strong lean-forward force on the seat occupant and in such cases, the foot brake is almost always stepped on and therefore, even if the speed change sensing means fails to operate for some reason or other, the draw-out of the webbing is locked in the above-described two embodiments.

Figure 6:
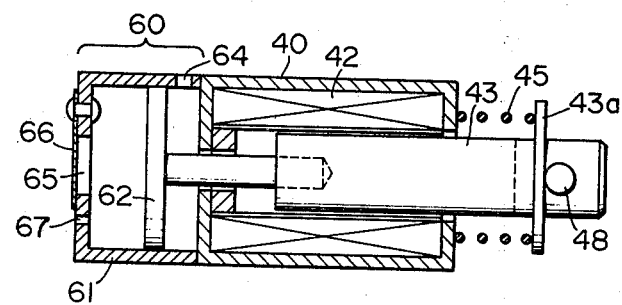
FIG. 6 is a cross-sectional view of delay means.

When the foregoing two embodiments are viewed from this aspect, the safety will be more enhanced if the mechanism adapted to lock the shaft in response to the operation of the foot brake includes means which will not immediately but a little later return the ratchet lever 30 to its initial position even when the foot brake is released immediately after it is stepped on and operated. Such means may be a dash pot shown in FIG. 6 which is coupled to the plunger 43 or a delay circuit added to the solenoid energizing circuit. In FIG. 6, a cylinder 61 is coupled to a solenoid container 40 and a piston 62 coating with the plunger 43 is fitted in the cylinder 61. Thus, when the solenoid 42 is energized and the plunger 43 is attracted leftwardly as viewed in FIG. 6, the piston 62 also slides leftwardly in the cylinder 61. In that case, air flows into the cylinder 61 through an air hole 64 and a reed 66 having one end secured to the bottom of the cylinder 61 flexes to permit air to flow out of the cylinder 61 through an air hole 65. Here, when the solenoid 42 is deenergized, the piston 62 can only slowly slide rightwardly because air slowly flows in through an air hole 67 and air slowly flows out through the air hole 64, and therefore the plunger 43 cannot immediately return to its initial position. If such means is added, the ratchet lever 30 is continuedly in its meshing position with the ratchet gear 15 even when the foot brake is intermittently stepped on, thus further increasing the safety of the ELR. The description of FIG. 6 has been made with respect to the first embodiment, but such delay means may also be added to the second embodiment.

Thus, the speed change sensing means of the ELR may be checked by the present invention and the user of the seat belt system of the vehicle or the like can utilize this system without anxiety.

Also, incidentally, the foot brake is almost always stepped on before a speed change occurs to the vehicle or the like and therefore, the draw-out of the webbing is locked a little earlier by the present invention, thus enabling the seat occupant to be restrained more safely with a small amount of webbing drawn out.

What I claim:

1. An emergency locking retractor for use in a vehicle comprising a webbing take-up shaft biased in a webbing take-up direction, a lock member having an engaging position with respect to said shaft for preventing rotation of the shaft in a webbing draw-out direction and a disengaged position allowing rotation of the shaft in the webbing draw-out direction, a speed-change sensing member, a first drive member connected between said sensing member and said lock member for moving said lock member between said positions responsive to speed-change induced changes in the condition of said sensing member, a second drive member associated with said lock member for moving said lock member from the disengaged position to the engaging position independently of said first drive member and switch-actuated electrical means for operating said second drive member.

2. An emergency locking retractor according to claim 1, wherein said electrical means includes a solenoid.

3. An emergency locking retractor according to claim 1, wherein said switch is closed in response to the operation of the foot brake of said vehicle to energize said electrical means.

4. An emergency locking retractor according to claim 3, wherein said electrical means is energized when said switch is closed in response to the operation of said foot brake during the use of a seat belt system.

5. An emergency locking retractor according to claim 3, wherein said electrical is energized when said switch means is closed in response to the operation of said foot brake during the operation of an engine.

6. An emergency locking retractor according to claim 1, wherein said sensing member is adapted to change position responsive to a speed-change of a predetermined value and said first drive member has a mechanical connection with said sensing member for mechanically translating changes in position of said sensing member into movement of the lock member.

7. An emergency locking retractor for use in a vehicle comprising a webbing take-up shaft biased in a webbing take-up direction, a lock member having an engaging position with respect to said shaft for preventing rotation of the shaft in the webbing draw-out direction and a disengaged position allowing rotation of the shaft in the webbing draw-out direction, speed-change sensing means causing the lock member to assume the disengaged position when the sensing means senses a speed-change below a predetermined value and for moving the lock member to the engaged position when the sensing means senses a speed-change exceeding the predetermined value, the speed-change sensing means including a speed-change sensing member sensitive to forces resulting from speed changes so as to change position under the influence of a speed change of a predetermined value and a drive member between the sensing member and the lock member, said drive member having a mechanical connection with the sensing member for mechanically translating changes in position of the sensing member to movement of the lock member, the retractor further including switch-actuated electrical means for moving the lock member independently of said sensing member.

* * * * *